US010073819B2

(12) United States Patent
Vernica et al.

(10) Patent No.: US 10,073,819 B2
(45) Date of Patent: Sep. 11, 2018

(54) MEDIA TABLE FOR A DIGITAL DOCUMENT

(71) Applicant: Hewlett-Packard Development Company, L.P., Fort Collins, CO (US)

(72) Inventors: Rares Vernica, Palo Alto, CA (US); Jerry Liu, Palo Alto, CA (US); Shanchan Wu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/315,340

(22) PCT Filed: May 30, 2014

(86) PCT No.: PCT/US2014/040134
§ 371 (c)(1),
(2) Date: Nov. 30, 2016

(87) PCT Pub. No.: WO2015/183294
PCT Pub. Date: Dec. 3, 2015

(65) Prior Publication Data
US 2017/0206186 A1 Jul. 20, 2017

(51) Int. Cl.
| G06F 17/00 | (2006.01) |
| G06F 17/21 | (2006.01) |
| G06F 17/22 | (2006.01) |
| G06F 17/24 | (2006.01) |
| G06T 11/60 | (2006.01) |
| G06T 3/40 | (2006.01) |
| G06F 17/30 | (2006.01) |

(52) U.S. Cl.
CPC ........ *G06F 17/212* (2013.01); *G06F 17/2235* (2013.01); *G06F 17/245* (2013.01); *G06F 17/30011* (2013.01); *G06F 17/30017* (2013.01); *G06F 17/30247* (2013.01); *G06T 3/4092* (2013.01); *G06T 11/60* (2013.01); *G06T 2200/24* (2013.01)

(58) Field of Classification Search
CPC .................. G06F 17/212; G06F 17/30017
See application file for complete search history.

(56) References Cited

U.S. PATENT DOCUMENTS 5,661,665 A * 8/1997 Glass ................... H04N 21/242
348/390.1
6,397,213 B1 5/2002 Cullen et al.
(Continued)

FOREIGN PATENT DOCUMENTS

JP          09146737 A  *  6/1997
JP        2010092383 A  *  4/2010
(Continued)

OTHER PUBLICATIONS

"Mantano eBook Reader Free", Feb. 17, 2014.
Charney, L. "Wilkie Collins: The Rare Fiction Digital Collection", May 4, 2010.

*Primary Examiner* — Laurie A Ries
(74) *Attorney, Agent, or Firm* — HP Inc. Patent Department

(57) ABSTRACT

A media table can be created by searching a digital document to identify media content within the digital document in a format associated with a client device and creating a media table containing a view of each of the identified media content.

18 Claims, 4 Drawing Sheets

(56) References Cited

U.S. PATENT DOCUMENTS

| | | | |
|---|---|---|---|
| 6,571,054 B1 | 5/2003 | Tonomura et al. | |
| 7,860,309 B1* | 12/2010 | Bodnar | G06K 9/00677 |
| | | | 358/538 |
| 8,082,512 B2* | 12/2011 | Gedye | G06Q 30/02 |
| | | | 715/767 |
| 8,156,444 B1* | 4/2012 | Lawrence | H04N 7/162 |
| | | | 715/273 |
| 8,706,685 B1 | 4/2014 | Smith et al. | |
| 9,141,591 B2* | 9/2015 | Pereymer | G06F 17/2247 |
| 9,405,751 B2* | 8/2016 | Hull | G06F 17/30047 |
| 2003/0110234 A1* | 6/2003 | Egli | G06T 3/4092 |
| | | | 709/217 |
| 2004/0193571 A1 | 9/2004 | Barrus et al. | |
| 2007/0094588 A1* | 4/2007 | Klassen | G06F 17/30905 |
| | | | 715/210 |
| 2007/0279529 A1* | 12/2007 | Buchanan | G06F 17/30058 |
| | | | 348/604 |
| 2009/0063431 A1* | 3/2009 | Erol | G06F 17/30247 |
| 2011/0055209 A1* | 3/2011 | Novac | G06F 17/211 |
| | | | 707/737 |
| 2011/0191328 A1* | 8/2011 | Vernon | G11B 27/034 |
| | | | 707/723 |
| 2013/0047115 A1 | 2/2013 | Migos et al. | |
| 2013/0139053 A1* | 5/2013 | Le Chevalier | G06Q 30/0601 |
| | | | 715/255 |
| 2013/0145241 A1* | 6/2013 | Salama | G06F 17/211 |
| | | | 715/202 |
| 2013/0205202 A1* | 8/2013 | Xiao | G06F 17/218 |
| | | | 715/249 |
| 2013/0254645 A1 | 9/2013 | Haynes et al. | |
| 2013/0268826 A1 | 10/2013 | Nowakowski et al. | |
| 2013/0283313 A1* | 10/2013 | Miyamoto | H04N 21/81 |
| | | | 725/37 |
| 2013/0317482 A1* | 11/2013 | Lupton | A61M 25/09 |
| | | | 604/528 |
| 2014/0047308 A1 | 2/2014 | Chub et al. | |

FOREIGN PATENT DOCUMENTS

| | | |
|---|---|---|
| JP | 2010092383 A | 4/2010 |
| WO | WO-0141018 A1 | 6/2001 |
| WO | WO-2010108159 A2 | 9/2010 |

\* cited by examiner

MEDIA TABLE FOR A DIGITAL DOCUMENT

BACKGROUND

Digital documents, such as an electronic book, can allow a user to view content without printing the digital document. A digital document, as used herein, intends to be information and media content in a digital form. The digital document can include text and media content such as images and videos, and can be readable on computing devices. Example digital documents can include electronic books (sometimes referred to as e-book, eBook, ebook, digital book, or e-edition) electronic articles, electronic magazines, etc.

DETAILED DESCRIPTION

Figure 1:
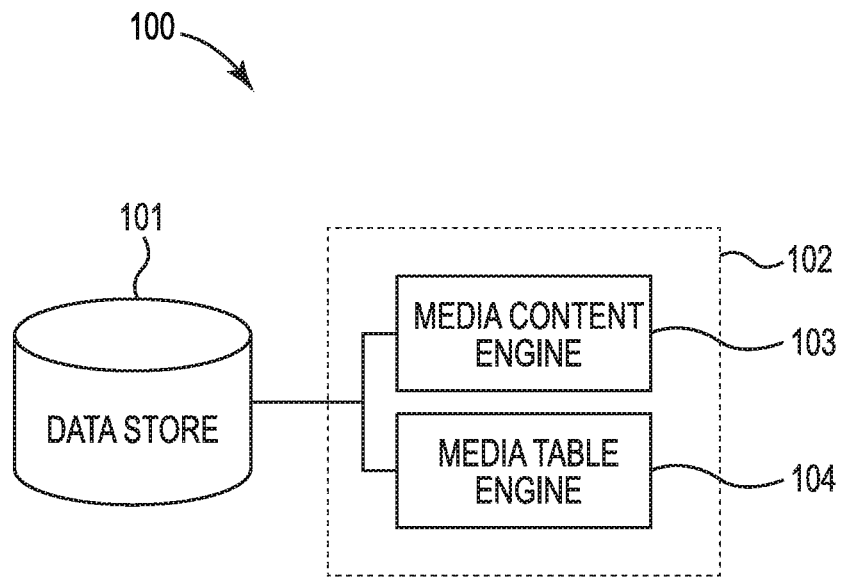
FIG. 1 illustrates an example of a system according to the present disclosure.

Use of digital documents has been increasing due to demands for increased ease of access to information and increased ability of computing devices to process digital documents. For instance, a paper textbook for educational purposes can be accessed as a digital document by a user on multiple different computing devices. Digital documents can allow for a multitude of media to be embedded within the documents. The media can include images, videos, audio, animations and/or interactive experiences, among other media. Media can enhance a user's consumption of the content of the digital document, particularly in regards to educational material.

Some users may have a difficult time transitioning from a paper document to a digital document. A user reading a digital document may miss the spatial and tactile cues that are present in a printed document. With a printed document, a user can easily flip between pages and can understand how far in the document the user is (e.g., half-way through the document). With a printed document, the location of visually prominent contents such as images is always in the same place within a page and within the document. By contrast, with a digital document a user may have a difficult time recalling where in the digital document the particular content was located. Since the layouts of digital documents may change depending on the device and settings a user is using, the location of these visually prominent landmarks within the digital document may not be constant. Visual memory can be useful to a user to recall content when reading a digital document. This can include the actual content of the media and position of the media content on the page. For example, a user may remember that particular information is on the page with the butterfly in the top right corner, without necessarily remembering what page the content is on.

The table of contents and/or index of a printed document (e.g., a book) can be important for accessing content in a various ways (e.g., by a specific chapter, image or figure, word, etc.) The table of contents and/or index of a printed document is created by the publisher at time of production. However, with a digital document, the layout of the digital document can be different for each type of computing device. For example, a digital document formatted for a smartphone can have additional pages than the same digital document formatted for a desktop computer. Particular content (e.g., butterfly) in the digital document formatted for the smartphone can be on a different page and/or location within a page then the same content on the same digital document formatted for the desktop computer.

Examples of the present disclosure can include a media table created for a digital document that is formatted for a particular computing device. The media table can include a view of various media content, such as images and video, located in the digital document and link information to a page that each media content is located on. As a user may remember that information is on the same page as the picture of the butterfly, he can go to the media table, navigate to the picture of the butterfly in the media table, and select the butterfly. Upon selecting the butterfly, the particular page of the digital document formatted for the particular computing device that the butterfly is located on can be displayed.

A user may remember images and/or other media content more easily than text and can navigate the digital document more easily than a table of contents containing text. Further, the media table created for a digital document formatted for a particular device can increase the accuracy of the link information resulting in a user being linked to the appropriate page as compared to a media table created by a publisher.

FIG. 1 illustrates an example of a system 100 according to the present disclosure. The system 100 can be utilized to create a media table for a particular client device according to the present disclosure. The system 100 can include a data store 101 and/or a number of engines 102 (e.g., media content engine 103 and media table engine 104). The number of engines 102 can be in communication with the data store 101 via a communication link. The number of engines 102 can include additional or fewer engines than illustrated to perform the various functions described herein.

The media content engine 103 and the media table engine 104 can include a combination of hardware and programming that is configured to perform a number of functions described herein (e.g., create a media table formatted for a client device). The programming can include program instructions (e.g., software, firmware, etc.) stored in a memory resource (e.g., computer readable medium, machine readable medium, etc.) as well as hard-wired program (e.g., logic). As used herein, an "engine" can include software and/or hardware, but at least includes hardware.

The media content engine 103 can include hardware and/or a combination of hardware and programming to search a digital document to identify media content within the digital document in a format associated with the client device. Media content, as used herein, intends to be non-text information and experiences. For example, the media content can include images, video, audio, and/or interactive features.

Identifying media content, in some examples, includes extracting media content identified from the search and/or associating each extracted media content with a page within the digital document on which the extracted media content is located. A page, as used herein, includes a screen (e.g., user interface) of content. The format associated with the client device is based on specifications of the client device.

Specifications of a client device, as used herein, intend to be a screen resolution, pixel density, and/or aspect ratio of the particular client device. For example, the specification used to format the digital document can include a combination of screen resolution, pixel density, and/or aspect ratio, but at least includes the screen resolution. For instance, the screen resolution, pixel density, and aspect ratio of specific client devices may be known.

A screen resolution, as used herein, intends to be a number of pixels in each dimension that can be displayed on the screen of the client device. A screen resolution can be expressed by width times height with units in pixels (e.g., 1024 pixels×768 pixels). In some examples, the display can include a three-dimensional (3D) display and the screen resolution can be expressed in 3D (e.g., width, height, and depth). Pixel density, as used herein, intends to a number of pixels per unit distance or area of the screen of the client device. Example pixel densities can include pixels per inch or pixels per centimeters. Aspect ratio, as used herein, intends to be a proportional relationship between the width and height of the screen of the client device. An aspect ratio can be expressed as two numbers separated by a colon (e.g., x:y, where x is the width and y is the height of the screen).

In some examples, the specifications of the client device can include a user setting. A user setting can include a setting associated with the digital document and/or display of the digital document that is selected by a user of the client device. An example user setting can include font type and/or font size, among other settings.

For different client devices, a particular page (e.g., page 2) may contain different content due to the screen resolution, pixel density, aspect ratio of the client device, and/or a user setting. For example, a client device, such as a tablet, may be used to import a digital document. The client device can fill the user interface with the media content and/or text until the particular screen is filled and the remaining content can start on the next screen (e.g., next page).

Each media content within the media table can include link information pointing to a position of the media content within the digital document. The link information, as used herein, can include a page within the digital document formatted for the client device on which the media content is located. The particular page can be displayed on a user interface of the client device in response to a selection of the media content in the media table (e.g., user selection). The link information (and link) between a particular media content and the page on which the particular media content is located can exist as computer-readable instructions (e.g., in computer memory and not a physical link).

A client device, as used herein, is intended to be hardware components and/or computer-readable instruction components (e.g., a computing device) that initiates contact with a server device to make use of a resource. A server device can include hardware components and/or machine-readable instruction components that selectively share resources. The client device and the server device can exchange messages over a network to share resources. The messages can include requests and/or responses, wherein the client device sends a request and the server returns a response. The messages can be sent using a communication link within the network and using a communication protocol. The network, in various examples, can include the Internet.

A user interface, as used herein, can be a space where interactions between a user and a computing device occur (e.g., allows a user to interact with a computing device using images and/or text). A user interface can include hardware components and/or machine-readable instruction components. For instance, hardware components can include input components (e.g., a mouse, a touch screen, and a keyboard) and output components for the computing device to indicate the effects of user input (e.g., display). An example user interface can include a graphical user interface (GUI). A GUI can, for example, represent actions and tasks available to a user through graphical icons and visual indicators.

The media table engine 104 can include hardware and/or a combination of hardware and programming to create a media table containing a view of each of the identified media content. For example, the media table engine 104 can create a media table that includes a view of the media content, wherein each view in the media table includes a fixed width and height.

Alternatively or in addition, the media table engine 104 can create a media table that includes a context layout of each media content. Context layout, as used herein, intends to be the position of the media content from the page of the digital document that contains the media content (e.g., the media content is located on). Example positions include a location within the page (e.g., centered, left, and/or right aligned, height and/or width of the position within the page, etc.) and/or dimensions of the media content (e g., a height and a width of the media content).

The view can include a static image and/or dynamic image of the media content. A static image, as used herein, intends to be a still image. For instance, a static image of a video and/or audio can include a still image that represents the video or audio. A dynamic image, as used herein, intends to be a moving image (e.g., kinetic image). For instance, a dynamic image of a video and/or interactive experience can include a loop of images, a graphic interchange format (GIF), and/or an animation, etc. Further, a dynamic image of audio can include a moving image indicating available audio media content.

In some examples, the system 100 can include an import engine (not illustrated in FIG. 1). The import engine can include hardware and/or a combination of hardware and programming to send the created media table to the client device. The media table can be sent as a communication package containing the digital document in response to a message requesting the digital document from the client device. Alternatively, the media table can be sent as an update package to the remote device that has previously imported the digital document. Further, in various examples, the client device may contain the media content engine 103 and the media table engine 104 which can perform their respective function upon importation of the digital document.

In various examples, the system 100 can include a filter engine (not illustrated in FIG. 1). The filter engine can include hardware and/or a combination of hardware and programming to identify attributes associated with each of the plurality of identified media content within the media table for filtering. Attributes, as used herein, intends to be characteristics and/or features of the media content. Example attributes can include media type, size, dimensions, topic, and/or location in the digital document, among other attributes. That is, the attributes can include intrinsic characteristics to the presentation of the media content (e.g., color, black and white, top of page, bottom of page, centered, etc.) and/or intrinsic characteristics to the context of the media content (e.g., media type, person, animal, plant, graph, etc.).

In some examples, a server device can include the filter engine, and the client device can import the identified attributes associated with the media content. For instance, the identified attributes associated with the media content can be imported with and/or be a portion of the media table. Alternatively and/or in addition, the client device can include the filter engine and can identify the attributes associated with the media content contained in the media table. In either example the client device and/or a server device can filter the media table based on a user selected filter. A filter, as used herein, intends to be a function that processes a data structure (e.g., the media table) to produce a new data structure (e.g., a media table containing a subset of the identified media content) for which a given predicate returns the Boolean value true.

In various examples, the media content engine 103 can search a collection of digital documents (e.g., a plurality) to identify media content. Each of the digital documents in the collection can be in a format associated with the particular client device. In such examples, the media table engine 104 can create a media table containing a view of each of the identified media content from the collection of digital documents.

The media content engine 103 and/or the media table engine 104 can be associated with a client device and/or a server device. For example, the client device can include the system 100 and can perform the functions associated with the media content engine 103 and the media table engine 104 after and/or during importation of the digital document to the client device. Alternatively, a number of server devices can include the system 100 and can perform the functions associated with the media content engine 103 and the media table engine 104. The number of server devices can perform the functions prior to importation of the digital document, during importation and/or after (e.g., and the media table can be imported to the client device separately). In some instances, the server devices can perform at least a portion of the functions prior to importation and the output can be saved in a computing system (e.g., cloud computing system, cache system, etc.). Further, a portion of the processing can occur on the client device and a portion can occur on the server devices, for example.

That is, in various examples, the computation performed by the system 100 can be performed completely by a client device, the server device, or both. For instance, the server device or client device can store (in cache) an output of a computation associated with a particular digital document formatted for a particular device. The output can include identification of media content and/or a media table. The server device can use the cached data for a future computation (e.g., for a different device of the same kind as the particular device or for the particular device the next time the digital document is accessed). Computing on the client device can increase latency as the format of the digital document may update over time. By contrast, computing on the server device can reduce a computation requirement of the client device and decrease computation time.

In a number of examples, a digital document can be accessed by a user on a plurality of client devices. Each of the plurality of client devices can include different specifications (different screen resolutions, pixel densities, aspect ratios, and/or user settings). In such instances, a media table can be created for each of the plurality of client devices when the user accesses the digital document using a particular client device.

For example, a user may import a digital document and store the digital document on an external system (e.g., a cloud computing system). The user may have multiple client devices. Each of the client devices may include the system 100 to search the digital document to identify media content and create a media table for the digital document formatted for the particular client device. The identified media content and/or media table can be stored on the client device and/or the external system for future use (e.g., the next time the user accesses the digital document using the client device). Alternatively and/or in addition, the external system can include the system 100 and can search the digital document to identify media content and create a media table for the digital document formatted for the particular client device when the uses accesses (e.g., imports from the external system) the digital document using the particular client device.

Further, in various examples, the external system can perform the search of the digital document and creation of the media table prior to the user accessing the digital document using the particular client device. The computation performed can include the full computation and/or a portion of the computation to increase the speed of the processing based on known specifications of the particular client device. For example, the external system may know which particular client devices the user has and/or may pre-compute portions or all of the functions of the system 100 based on known specifications of the known particular client devices. The user, in some examples, may provide an indication of which devices the user is likely to use. Or, alternatively, the external system may pre-compute for common client devices (e.g., particular tablet models, smartphone models, and/or other computing device models).

By computing the media table for a particular client device, the user can access the digital document using multiple client devices. The media table for the digital document formatted for a first client device the user is using at the time can assist the user in navigating the digital document that may have a different layout for the first client device as compared to a previous layout the user viewed for a second client device. The user may desire to find information that was near a particular media content that they can remember from the previous layout, such as an elephant. The user can access the particular media content (and, thus, information) by selecting the elephant in the media table that they remembered from the digital document in the previous layout.

Figure 2:
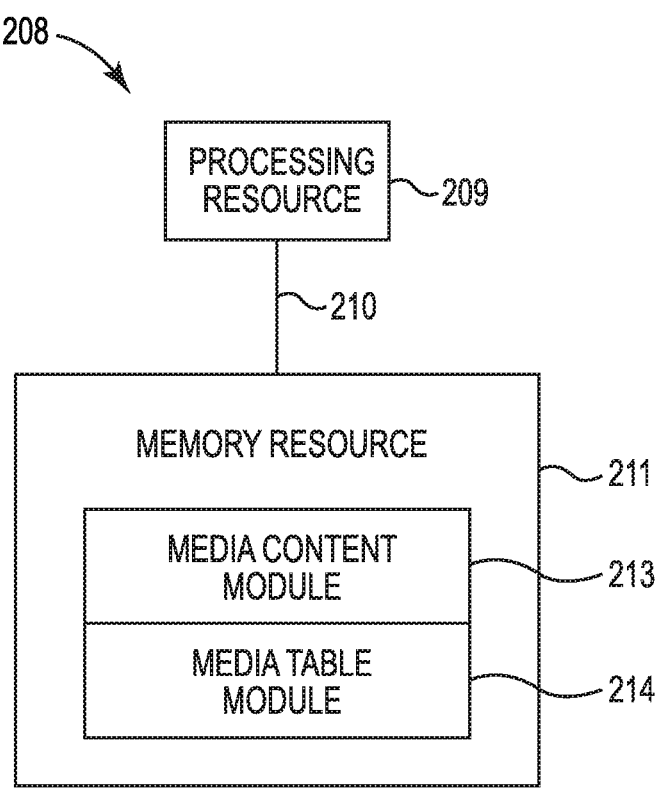
FIG. 2 illustrates an example of a computing device according to the present disclosure.

FIG. 2 illustrates an example computing device 208 according to the present disclosure. The computing device 208 can utilize software, hardware, firmware, and/or logic to perform a number of functions described herein.

The computing device 208 can be any combination of hardware and program instructions configured to share information. The hardware, for example can include a processing resource 209 and/or a memory resource 211 (e.g., computer-readable medium (CRM), machine readable medium (MRM), database, etc.). A processing resource 209, as used herein, can include any number of processors capable of executing instructions stored by a memory resource 211. Processing resource 209 may be integrated in a single device or distributed across multiple devices. The program instructions (e.g., computer-readable instructions (CRI)) can include instructions stored on the memory resource 211 and executable by the processing resource 209 to implement a desired function (e.g., create a media table).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a client device, on a server device, on a collection of server devices, and/or a combination of the client device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules (e.g., media content module 213 and media table module 214) can include CRI that when executed by the processing resource 209 can perform a number of functions. The number of modules can be sub-modules of other modules. For example, the media content module 213 and the media table module 214 can be sub-modules and/or contained within the same computing device. In another example, the number of modules can comprise individual modules at separate and distinct locations (e.g., CRM, etc.). As used herein, a "module" can include software and/or hardware, but at least includes software.

Each of the number of modules can include instructions that when executed by the processing resource 209 can function as a corresponding engine as described herein. For example, the media content module 213 can include instructions that when executed by the processing resource 209 can function as the media content engine 103. In another example, the media table module 214 can include instructions that when executed by the processing resource 209 can function as the media table engine 104.

In various examples, the media table module 214 and/or an additional module (such as a media display module) can include instructions that when executed by the processing resource 209 cause a computer to import a media table containing a plurality of identified media content of a digital document formatted for the client device. The media table module 214 and/or the additional module can be executed using a client device. The media table module 214 can display the media table on a user interface of the client device and display a page of the digital document associated with a media content among the plurality of media content on the user interface in response to input (e.g., user input) in the media table. The display of the media table can include a view of each of the plurality of identified media content, as discussed further herein. In various examples, the display of the media table can include a 3D display.

In some examples, the media table module 214 and/or the additional module can include instructions that when executed by the processing resource 209 cause a computer to perform a function of the media content within the media table in response to a user selection of the media content. For instance, the media content can include a video, audio, animation, and/or an interactive experience. The performance of the function of the media content can include playing a video stream, audio stream, an animation, and/or an interactive experience within the user interface that is displaying the media table.

Figure 3:
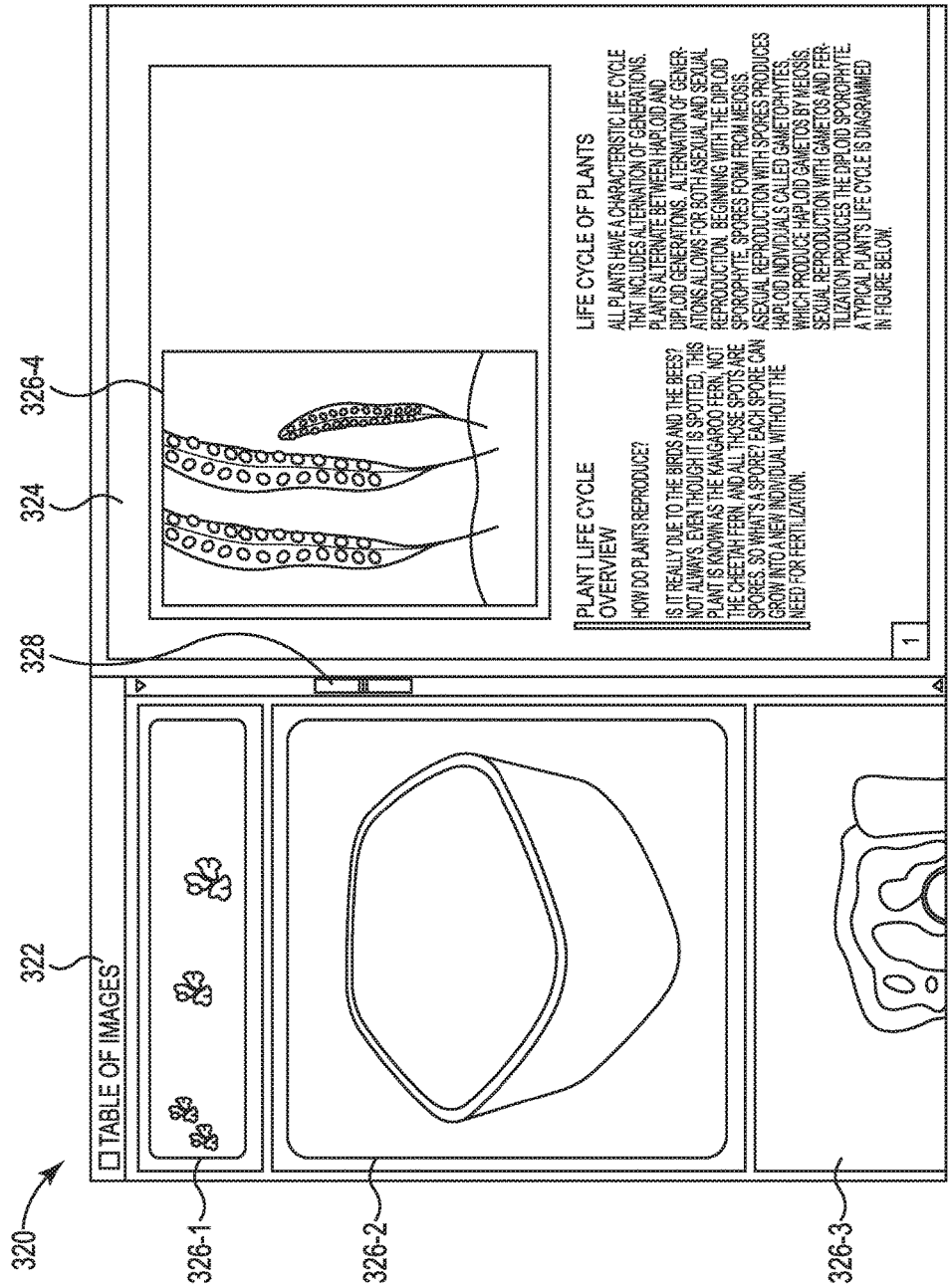
FIG. 3 is a diagram of an example of a user interface for displaying a media table for a digital document according to the present disclosure.

FIG. 3 is a diagram of an example of a user interface 320 for displaying a media table 322 for a digital document according to the present disclosure. The user interface 320 can include a display of the media table 322 and/or a page 324 of the digital document.

The media table 322, in some examples, can include a table of images. However, examples in accordance with the present disclosure are not so limited and can include dynamic images of the media content.

The media table 322 can be created for a digital document in a format associated with a particular client device. For instance, the format of the digital document can be based on specifications (e.g., screen resolution, pixel density, aspect ratio, and/or user setting) of the client device. Based on the specifications, media content may be located on particular pages of the digital document. The location of the media content can vary between different client devices (e.g., between a tablet and a smartphone). For instance, the variation of location can include different pages and/or different positions within a page (e.g., top verses bottom of the page). The media table 322 (and/or the media table 422 as discussed further herein in regards to FIG. 4) can be created using a media content engine to search the digital document and a media table engine to create the media table, as previously discussed.

As illustrated by FIG. 3, the display on the user interface 320 can include the media table 322. The media table 322 displayed can include a view (e.g., an image) of each media content 326-1, 326-2, 326-3 that includes a fixed dimension (height and width). That is, each view in the media table 322 can include the same sized view. The view of each media content 326-1, 326-2, 326-3 can be in a list that can be scrolled using a scroll bar 328 by a user.

The user using the client device can, in some examples, select a view of a media content 326-4 within the media table 322. In response to the selection, the page 324 that the selected media content 326-4 is located on can be displayed. That is, the display on the user interface 320 can include a display of both the media table 322 and the page 324 containing the selected media content 326-4. The selection can include an input, such as a user input. A user input can include a signal or data received by the client device from the user to communicate. Example user inputs can include clicking or selecting a media content using a keyboard, a mouse, and/or a screen (e.g., a touch screen), among other inputs.

In various examples, the user can delete particular media content in the media table 322. For instance, in response to input (e.g., user input), media content can be deleted from the media table 322. A user may, for instance, determine that particular media content in the media table 322 is unwanted (e.g., not of interest, not relevant, etc.). The user can select the particular media content and manually delete the particular media content from the media table 322.

Figure 4:
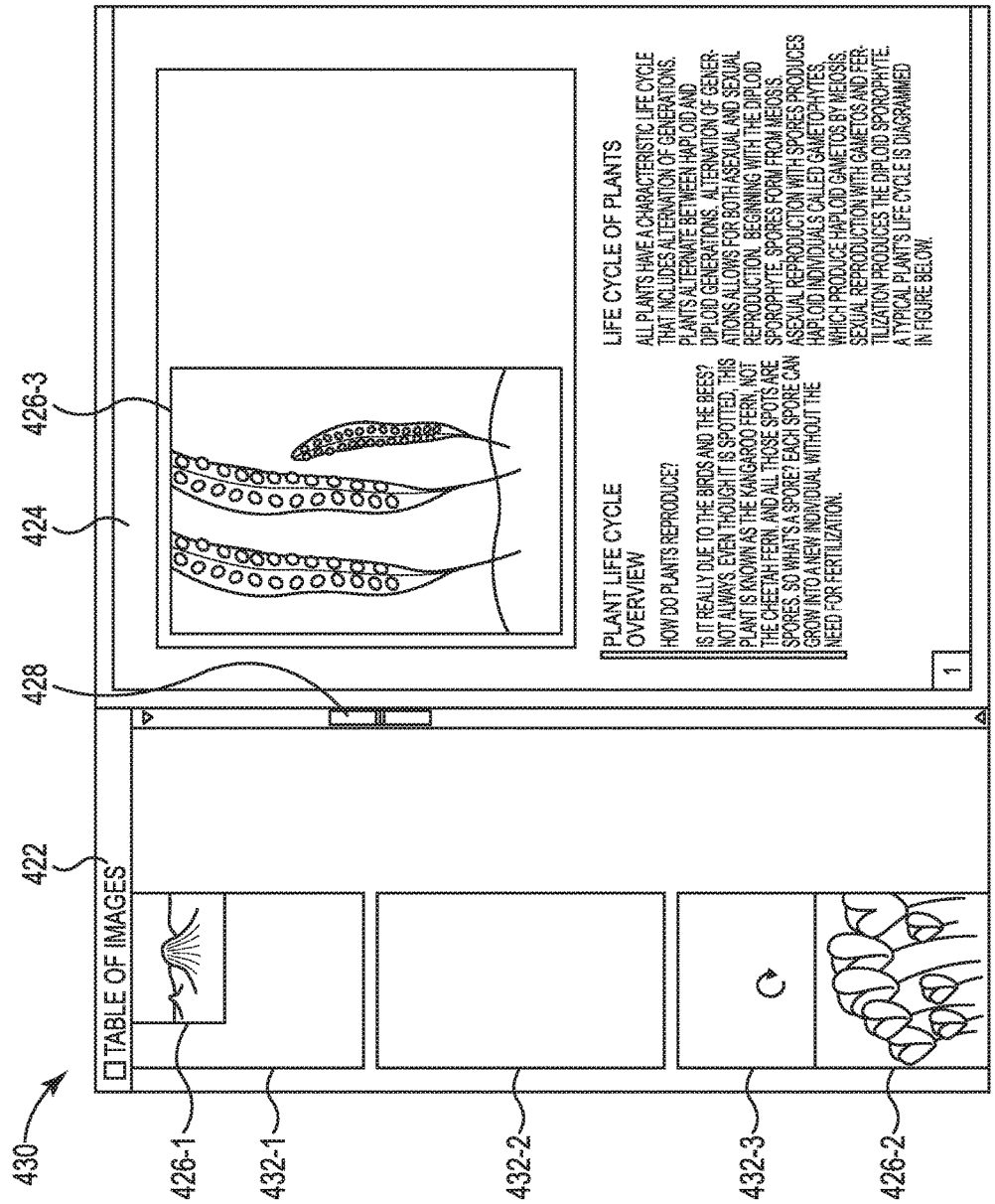
FIG. 4 is a diagram of an example of a user interface for displaying a media table for a digital document according to the present disclosure.

FIG. 4 is a diagram of an example of a user interface 430 for displaying a media table 422 for a digital document according to the present disclosure. The user interface 430 can include a display of the media table 422 and/or a page 424 of the digital document.

Similarly to the example illustrated in FIG. 3, the user interface 430 can include a display of the media table 422 and/or a page 424 of the digital document. The media table 422, in some examples, can include a table of images. Further, the media table 422 can be created for a digital document in a format associated with a specific client device, as previously discussed in regards to FIG. 3. The view of each media content 426-1, 426-2 can be a list that can be scrolled using a scroll bar 428 by a user.

As illustrated by FIG. 4, the media table 422 displayed can include a context layout of each media content 426-1, 426-2. That is, the display can include a view of each media content 428-1, 426-2 in context of where the media content 426-1, 426-2 appears within a page 432-1, 432-2, 432-3 of the digital document formatted for a particular client device (e.g., a position of the media content within a page). The context layout of each media content 426-1, 426-2 can be extracted using a media content engine, as previously discussed.

Further, the context layout can include a particular dimension of each media content 426-1, 426-2 when displayed on the page 432-1, 432-3. That is, the dimensions of the media content 426-1, 426-2 displayed in the media table 422 can include variable dimensions of the media content 426-1, 426-2 as to be displayed within the page 432-1, 432-2, 432-3.

In some examples, the media table 422 can include a view of each page 432-1, 432-2, 432-3 of the digital document. Particular pages (e.g., page 432-2) may not have media content but are still displayed in the media table 422. By displaying all pages regardless of media content in the media table 422 a user can see a preview of all pages in the digital document (e.g., using the scrollbar 428). Further, a user may have a better understanding of spatial dimensions of the digital book (e.g., how far apart are two particular media images).

However, examples in accordance with the present disclosure are not so limited. For instance, the media table 422 can include a view of pages of the digital document that have media content (pages 432-1 and 432-3) and may not include a view of pages of the digital document that do not have media content (page 432-2). By displaying only pages with media content, a user may more quickly identify media content to select to navigate the digital document as compared to a media table with all pages. A user may, for example, select which view of the media table to display (all pages or pages with media content).

Further, similarly to FIG. 3, the user using the client device can select a view of a media content 426-3 within the media table 422. In response to the selection, the page 424 that the selected media content 426-3 is located on can be displayed. That is, the display on the user interface 430 can include a display of both the media table 422 and the page 424 containing the selected media content 426-3. The selection can include a user input. In addition, as previously discussed, the user can delete particular media content in the media table 422.

The media table 322 illustrated in FIG. 3 and/or media table 422 illustrated in FIG. 4, can be filtered based on various filters. For instance, as discussed previously in regards to FIG. 1, a filter engine can identify attributes associated with each of the plurality of media content within the media table 322, 422 for filtering. The client device or server device can filter the media table 322, 422 based on a particular filter, as discussed further herein.

In various examples, the media table 422 illustrated in FIG. 4 can be of the same digital document formatted for the same device as the media table 322 illustrated in FIG. 3. Although examples in accordance with the present disclosure are not so limited. For instance, in some examples, a user can select how to display the media table 422. The media table 322 illustrated in FIG. 3 illustrates a media table 322 with media content 326-1, 326-2, 326-3 displayed at fixed dimensions. In contrast, the media table 422 illustrated in FIG. 4 illustrates a media table 422 with media content 426-1, 426-2 displayed in context of where the media content 426-1, 426-2 appears within a page 432-1, 432-2, 432-3 of the digital document and/or variable dimensions o the media content 426-1, 426-2 within the page 432-1, 432-2, 432-3.

Further, in some examples, the user interface can include a display of both media table 322 illustrated in FIG. 3 and media table 422 illustrated in FIG. 4. As an example, a user interface can include a display of a media table that includes a first table of images of the media content, wherein each image in the first table of images is a fixed width and height (e.g., media table 322 illustrated in FIG. 3); and a second table of images of the media content including a context layout of each of the media content (e.g., media table 422 illustrated in FIG. 4).

Figure 5:
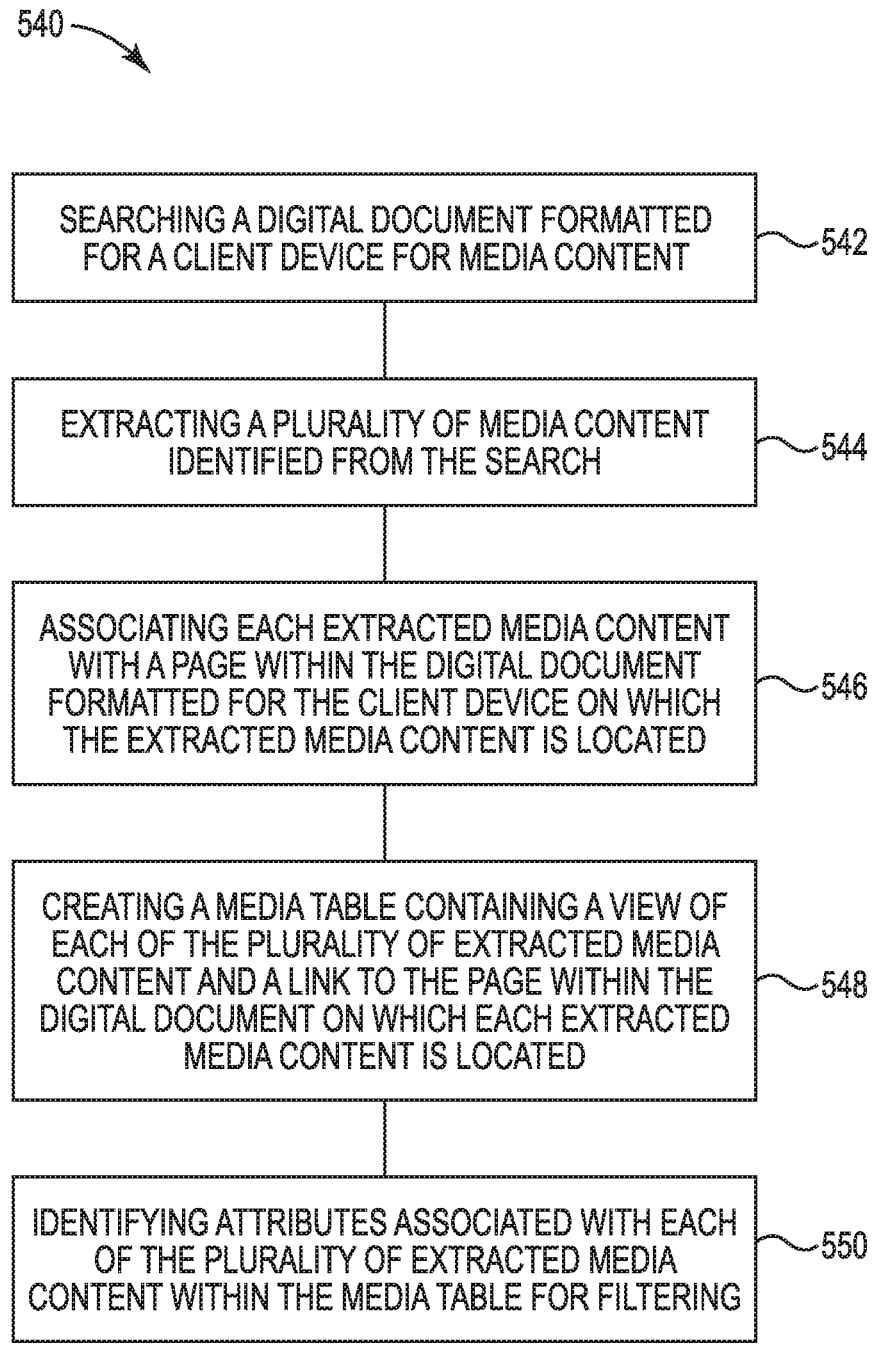
FIG. 5 illustrates a flow chart of an example of a method for creating a media table for a digital document according to the present disclosure.

FIG. 5 illustrates a flow chart of an example of a method 540 for creating a media table for a digital document formatted for a client device according to the present disclosure. The method can be performed using the system 100 illustrated in FIG. 1 and/or the computing device 208 illustrated in FIG. 2.

At 542, the method 540 can include searching a digital document formatted for a client device for media content. At 544, the method 540 can include extracting a plurality of media content identified from the search; and, at 546, the method 540 can include associating each extracted media content with a page within the digital document formatted for the client device on which the media content is located. A media content engine 103, as illustrated in FIG. 1, can be used to perform the search of the digital document, the extraction of media content, and/or the association of media content with a page within the digital document.

At 548, the method 540 can include creating a media table containing a view of each of the plurality of extracted media content and a link to the page within the digital document on which each extracted media content is located. The media table created can include a view of each media content in a fixed dimension and/or a view of each media content in context of where the media content appears within a page of the digital document. The creation of the media table can be performed by a media table engine 104, as illustrated in FIG. 1.

At 550, the method 540 can include identifying attributes associated with each of the plurality of extracted media content within the media table for filtering. The attributes can include intrinsic characteristics to the presentation of the media content and/or intrinsic characteristics to the context of the media content, among other attributes. For example, the attributes can include media type (e.g., movie, image, etc.), size, dimensions, topic, and/or location in the digital document. The identification of attributes can be performed by a filter engine, as previously discussed in regards to FIG. 1.

In some examples, the method 540 can include filtering the media content within the media table based on the attributes and a selected filter. For instance, a user can select a number of filters and/or can configure the filters. In response to filtering the media content based on a selected filter, a subset of the extracted media content can be displayed in the media table. The subset of the extracted media content can include the results of the filter. The client device or the server device can perform the filter, for instance.

In the preceding detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system, comprising:
a processor; and
a memory comprising code to cause the processor to:
search a digital document to identify media content within the digital document;
associate a display location within the page and within the document to each of the identified media content based on a format associated with a client device;
create a media table containing a view of each of the identified media content and the display location within the page and within the document of each of the identified media content; and
wherein each media content within the media table includes link information pointing to a position of the media content in the digital document, and wherein a selection of the media content in the media table displays a device formatted page containing the media content on a user interface of the client device.

2. The system of claim 1, including an import engine to send the created media table to the client device as a communication package containing the digital document.

3. The system of claim 1, wherein the format associated with the client device is based on a screen resolution of the client device.

4. The system of claim 1, wherein the media table includes a table of images of the media content, and wherein each image in the table of images is a fixed width and height.

5. The system of claim 1, wherein the media table includes a context layout of each of the media content.

6. The system of claim 5, wherein the context layout includes a position of the media content within the page of the digital document that contains the media content.

7. The system of claim 1, wherein the media table includes:
a first table of images of the media content, wherein each image in the first table of images is a fixed width and height; and
a second table of images of the media content including a context layout of each of the media content.

8. The system of claim 1, wherein the display location within the page and within the document is associated to the identified media content based on a format associated with the client device and a detected user setting associated with the client device.

9. A non-transitory computer-readable medium storing instructions executable by a processing resource to cause a computer to:
import a media table comprising:
a plurality of identified media content of a digital document formatted for a client device; and
a display location within the page and within the document associated with each of the identified media content;
display a view of each of the plurality of identified media content; and
display, in response to a selection, the display location within the page and within the document associated with one of the identified media content that is selected from the plurality of identified media content on the user interface, wherein each media content within the media table includes link information pointing to a position of the media content in the digital document, and wherein a selection of the media content in the media table displays a device formatted page containing the media content on a user interface of the client device.

10. The non-transitory computer-readable medium of claim 9, wherein the instructions executable by the processing resource include instructions executable to filter the media table based on a selected filter.

11. The non-transitory computer-readable medium of claim 9, wherein the instructions executable by the processing resource include instructions executable to delete media content from the media table in response to input.

12. The non-transitory computer-readable medium of claim 9, wherein the instructions executable by the processing resource include instructions executable to perform a media content within the media table in response to a selection of the media content.

13. A method for creating a media table for a client device, the method including:
searching a digital document formatted for a client device for media content;
extracting a plurality of media content identified from the search;
associating each extracted media content with a page within the digital document formatted for the client device on which the extracted media content is located;
creating a media table containing a view of each of the plurality of extracted media content, the page within the digital document on which each extracted media content is located, and a link to the page within the digital document on which each extracted media content is located, wherein each media content within the media table includes link information pointing to a position of the media content in the digital document, and wherein a selection of the media content in the media table displays a device formatted page containing the media content on a user interface of the client device; and
identifying attributes associated with each of the plurality of extracted media content within the media table for filtering.

14. The method of claim 13, wherein the attributes include at least one of media type, size, dimensions, topic, and location in the digital document.

15. The method of claim 13, including filtering the media content within the media table based on the attributes and a selected filter.

16. The method of claim 13, wherein the media table includes a context layout of each of the media content.

17. The method of claim 16, wherein the context layout includes a position of the media content within the page of the digital document that contains the media content.

18. The method of claim 13, wherein the media table includes:
- a first table of images of the media content, wherein each image in the first table of images is a fixed width and height; and
- a second table of images of the media content including a context layout of each of the media content.

* * * * *